Figure 1:
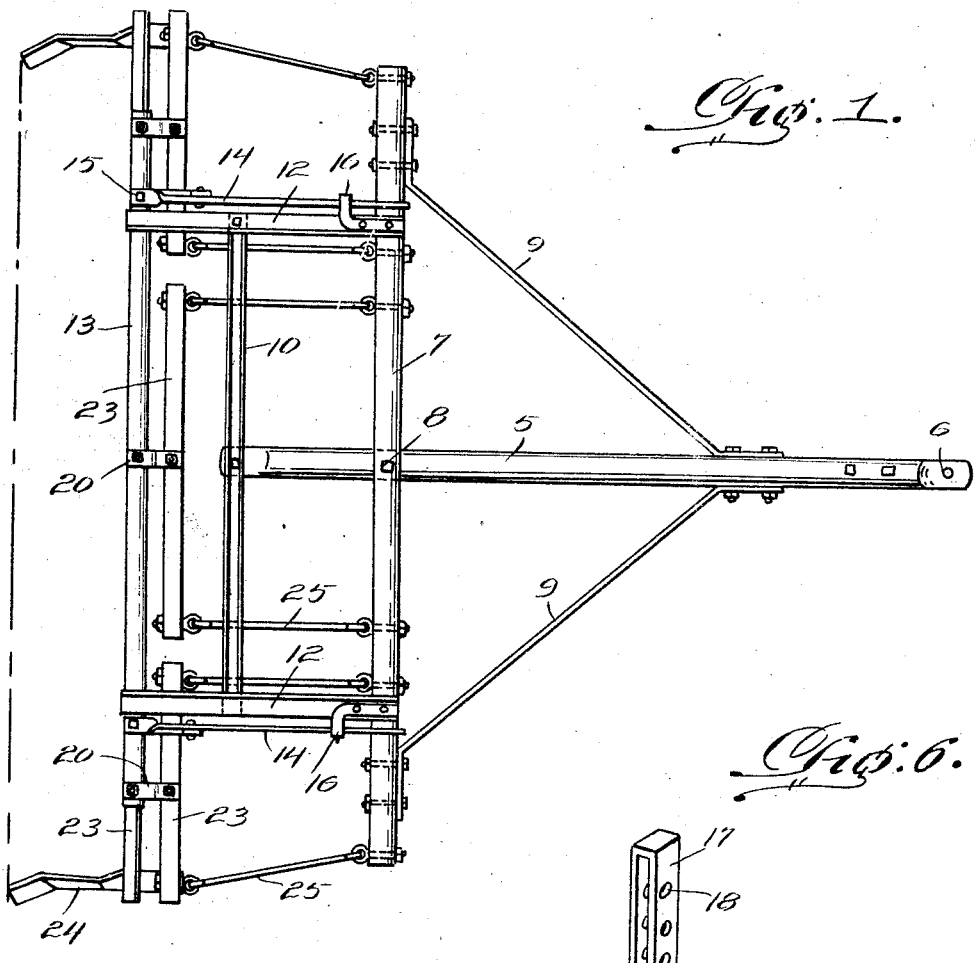

June 1, 1926.

A. H. CORBETT ET AL 1,586,612

HARROW

Filed June 6, 1925

2 Sheets-Sheet 1

Inventor
A.H.Corbett and
H. Pounds.

By Clarence A. O'Brien

Attorney

June 1, 1926. 1,586,612
A. H. CORBETT ET AL
HARROW
Filed June 6, 1925 2 Sheets-Sheet 2
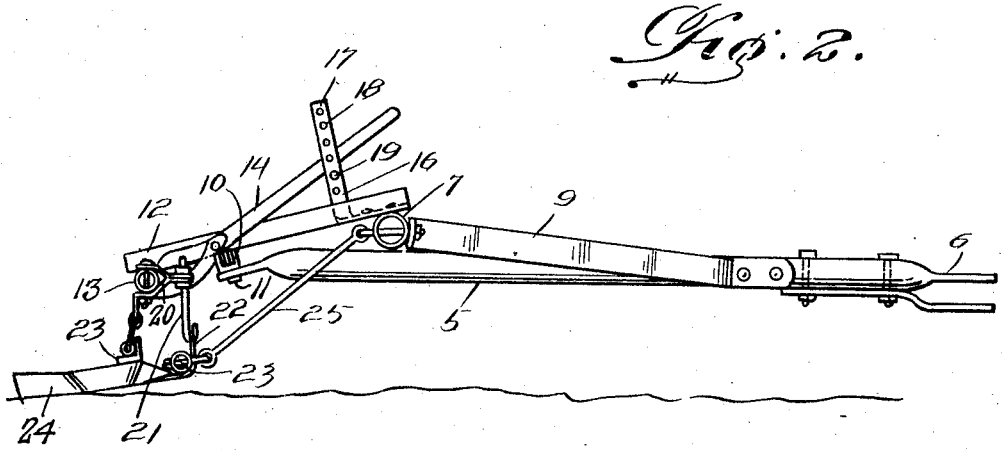
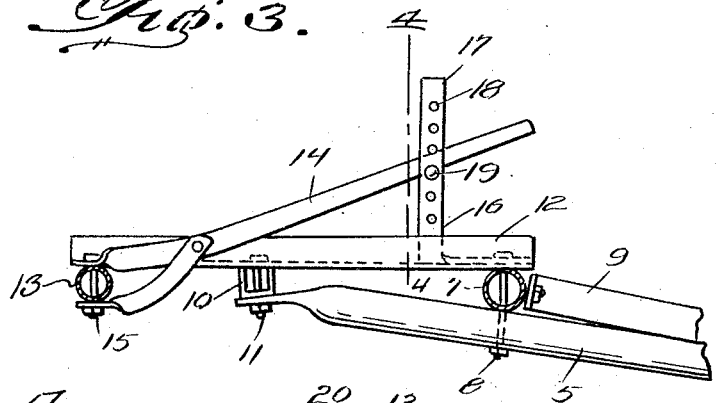
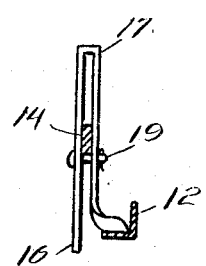
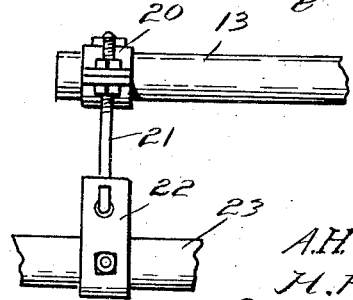
Inventor
A.H.Corbett and
H.Pounds
By Clarence A. O'Brien
Attorney

Patented June 1, 1926.

1,586,612

UNITED STATES PATENT OFFICE.

ALFRED H. CORBETT AND HOYLE POUNDS, OF WINTER GARDEN, FLORIDA.

HARROW.

Application filed June 6, 1925. Serial No. 35,479.

The present invention relates to a harrow, and has for its principal object to provide a highly novel structure wherein adjustments may be made for regulating the depth at which the harrow blades will cut into the soil.

Another important object of the invention is to generally improve upon harrow structures of this nature by providing a device of exceedingly simple formation, one which is strong, durable, inexpensive to manufacture, not likely to easily become out of order, easy to manipulate, efficient, reliable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 6:
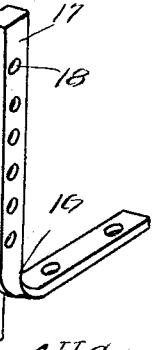

Figure 1 is a top plan view of the harrow embodying the features of our invention, Figure 2 is a side elevation thereof, Figure 3 is a fragmentary longitudinal section therethrough, Figure 4 is a detail section taken substantially on the line 4—4 of Figure 3, Figure 5 is a detail elevation showing the connection between the supporting bar, and one of the gang bars, and Figure 6 is a perspective view of the bracket used with this harrow.

Referring to the drawing in detail it will be seen that 5 designates a draw bar which is provided with an engaging structure 6 at its forward end in order that the bar may be attached in the usual manner to a tractor, or any other draft means or device. A cross beam 7 is attached intermediate its ends as at 8 to an intermediate portion of the draft bar 5. Braces 9 extend between the forward portion of the draft bar 5, and the ends of the cross beam 7. A second cross beam 10 is attached to the rear end of the draw bar 5 as at 11, and extends parallel to the cross beam 7. Longitudinally extending bars 12 have their forward ends connected to the beam 7, and their intermediate portions attached to the ends of the beam 10. These bars 12 extend in parallel spaced relation to each other, one on each side of the draw-bar 5 and parallel thereto. A supporting bar 13 is mounted to extend transversely of the rear portion of the harrow below the rear ends of the bars 12. A pair of cranks 14 are fixed to the supporting bar 13 adjacent its ends as at 15, one to the outer side of each bar 12. A pair of brackets 16 are mounted on the beam 7. Each bracket 16 includes an inverted U-shaped portion 17, the sides of which are provided with registering openings 18 for receiving pins 19. The cranks 14 extend between the sides of the U-shaped portions 17 of the brackets 16 and rest on the pins 19. By adjusting the cranks 14 in relation to the brackets 16 it will be seen that the supporting bar 13 may be rotated. Brackets 20 are fixed to the supporting bar 13 and mount depending hooks 21 which are engaged with members 22 on gang bars 23. On each gang bar 23 there is mounted a gang of harrow blades 24 of conventional construction. Links 25 are pivotally engaged with the ends of the gang bars 23 and with the cross beam 7. In actual use the device is supported on the harrow blades 24 and by the traction means in the position shown to advantage in Figure 2 and thus the longitudinal bars 12 rest on the supporting bars 13 which may be turned for regulating the angles of the blades 24 to the ground by the operation of the cranks 14, as indicated above.

From the above detailed description it will be seen that we have provided a very sturdy harrow which may be used to advantage with a tractor and which may be easily adjusted as desired. The harrow is compact in its arrangement of parts, and will prove efficient and reliable in operation.

It is thought that the construction, operation, utility, and advantages of the invention will now be clearly understood without a more detailed description. The present embodiment of the invention has been disclosed merely by way of example, and attains all the features of advantage enumerated in the statement of the invention, and the above description. It is apparent that numerous changes in the details of construction, and in the combination and arrangement of parts may be resorted to without departing from the spirit or scope of the invention as hereinafter claimed or sacrificing any of its advantages.

Having thus described our invention, what we claim as new is:—

1. In a harrow, a draw bar, a beam extending transversely of the intermediate portion of the draw bar, a second beam extending transversely of the rear end of the draw bar, a pair of longitudinal members fixed at their intermediate portions to the ends of the second beam and at their forward ends of the first mentioned beam, a supporting bar disposed below the longitudinal members at their rear ends, cranks fixed to the supporting bar, means for holding the cranks in different adjusted positions, and harrow blades mounted on the supporting bar.

2. In a harrow, a draw bar, a beam extending transversely of the intermediate portion of the draw bar, a second beam extending transversely of the rear end of the draw bar, a pair of longitudinal members fixed at their intermediate portions to the ends of the second beam and at their forward ends to the first mentioned beam, a supporting bar disposed below the longitudinal members at their rear ends, cranks fixed to the supporting bar, means for holding the cranks in different adjusted positions, gang bars suspended from the supporting bar, and harrow blades on the gang bars.

3. In a harrow, a draw bar, a beam extending transversely of the intermediate portion of the draw bar, a second beam extending transversely of the rear end of the draw bar, a pair of longitudinal members fixed at their intermediate portions to the ends of the second beam and at their forward ends to the first mentioned beam, a supporting bar disposed below the longitudinal members at their rear ends, cranks fixed to the supporting bar, means for holding the cranks in different adjusted positions, gang bars suspended from the supporting bar, and harrow blades on the gang bars, and links pivotally engaged with the gang bars and with the first mentioned beam.

4. In a harrow, a frame, a pair of members extending longitudinally of the frame and beyond the rear thereof, a supporting bar engaging the under surface of the rear end of the members, cranks for turning the supporting bar, means for holding the cranks in different adjusted positions, gang bars suspended from the supporting bar, and harrow blades on the gang bars.

5. In a harrow, a frame, a pair of members extending longitudinally of the frame and beyond the rear thereof, a supporting bar engaging the under surface of the rear end of the member, cranks for turning the supporting bar, means for holding the cranks in different adjusted positions, gang bars suspended from the supporting bar, harrow blades on the gang bars, and links connected with the gang bars and with the frame.

In testimony whereof we affix our signatures.

ALFRED H. CORBETT.
HOYLE POUNDS.